US006967947B1

(12) United States Patent
Chen et al.

(10) Patent No.: US 6,967,947 B1
(45) Date of Patent: Nov. 22, 2005

(54) METHOD AND SYSTEM FOR PROVIDING CONTROLLABLE ENHANCED CALL SERVICE FEATURES AT MOBILE LOCATIONS

(75) Inventors: Yihsiu Chen, Middletown, NJ (US); Mark Jeffrey Foladare, East Brunswick, NJ (US); Kathleen C. Fowler, Wall, NJ (US); Shelley B. Goldman, East Brunswick, NJ (US); Shaoqing Q. Wang, Middletown, NJ (US); Roy Philip Weber, Bridgewater, NJ (US); Robert S. Westrich, Middletown, NJ (US); Aleksandr Zelezniak, Matawan, NJ (US)

(73) Assignee: AT&T Corp., New York, NY (US)

( * ) Notice: Subject to any disclaimer, the term of this patent is extended or adjusted under 35 U.S.C. 154(b) by 1043 days.

(21) Appl. No.: 09/820,395

(22) Filed: Mar. 29, 2001

(51) Int. Cl.[7] .............................................. H04L 12/66
(52) U.S. Cl. ..................................... 370/353; 379/225
(58) Field of Search ................................ 370/352–356, 370/401; 379/225, 229, 221.15, 231–234, 379/216.01

(56) References Cited

U.S. PATENT DOCUMENTS

| | | | |
|---|---|---|---|
| 5,353,331 A * | 10/1994 | Emery et al. ................ | 455/461 |
| 5,757,904 A | 5/1998 | Anderson | |
| 5,870,465 A * | 2/1999 | Hosbach et al. ............. | 379/419 |
| 5,937,040 A | 8/1999 | Wrede et al. | |
| 5,960,073 A * | 9/1999 | Kikinis et al. .......... | 379/265.04 |
| 6,049,602 A * | 4/2000 | Foladare et al. ........ | 379/265.04 |
| 6,094,479 A * | 7/2000 | Lindeberg et al. ...... | 379/220.01 |
| 6,161,128 A | 12/2000 | Smyk | |
| 6,230,133 B1 * | 5/2001 | Bennett et al. .............. | 704/270 |
| 6,330,244 B1 * | 12/2001 | Swartz et al. ................ | 370/401 |
| 6,356,543 B2 * | 3/2002 | Hall et al. ................... | 370/352 |
| 6,456,711 B1 * | 9/2002 | Cheung et al. ......... | 379/265.09 |
| 6,516,061 B2 * | 2/2003 | Horowitz et al. ............ | 379/233 |
| 6,542,475 B1 * | 4/2003 | Bala et al. ................... | 370/271 |
| 6,763,102 B1 * | 7/2004 | Westrich et al. ........ | 379/221.15 |

* cited by examiner

Primary Examiner—Hassan Kizou
Assistant Examiner—Dmitry Levitan

(57) ABSTRACT

A system and method for providing PBX-like functionality at a mobile location includes the capability of maintaining a network session with a mobile number associated with a remote worker. The system utilizes a remote office platform interposed between a data communications network and a conventional PBX switch. A remotely located individual (such as a telecommuter) "logs in" to the remote office platform and, once the individual is authenticated, PBX-like communication with the mobile device is established. If the device is a computer-enabled device and includes a display, the platform can enable a graphical user interface emulating a PBX station set to the device. Alternatively, the remote worker can enter either spoken commands or series of DTMF sequences to utilize the PBX-like features. For these applications, the remote office platform includes a speech recognition module and a translation table for converting a sequence of DTMF tones into a PBX-like call feature (e.g., transfer, hold, mute, etc.).

11 Claims, 5 Drawing Sheets

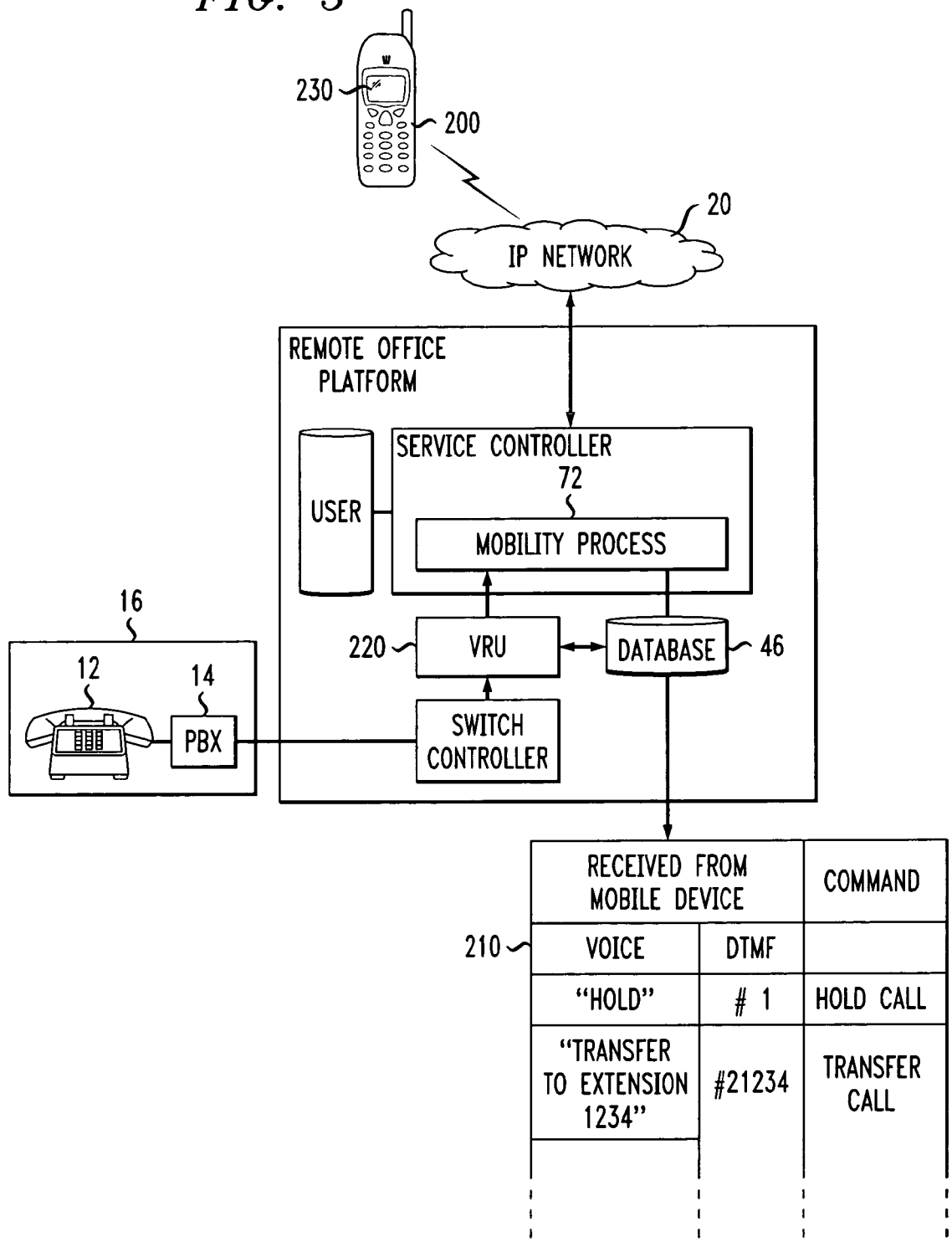

METHOD AND SYSTEM FOR PROVIDING CONTROLLABLE ENHANCED CALL SERVICE FEATURES AT MOBILE LOCATIONS

TECHNICAL FIELD

The present invention relates to a method and system for incorporating mobile location control of enhanced call service features at the mobile location such that the PBX-like features can be accessed anywhere.

BACKGROUND OF THE INVENTION

During the past decade, the number of professionals that "telecommute" (i.e., work at home or other "virtual office" locations) has increased significantly. Although the proliferation of various types of computing and telephony equipment has enabled these workers to be effective, there remain a number of office-related advantages that cannot, without great expense, be duplicated at home. Additionally, in situations where an individual spends a significant amount of time traveling, it becomes even more difficult to provide certain advantages, such as PBX-based telecommunication features as are found in most conventional office environments. A private branch exchange (PBX) switch is commonly known in the art as a system useful in providing certain calling features such as abbreviated dialing, call transfer, hold, mute, and others, within an office complex served by the PBX switch. One exemplary PBX switch is the Definity™ switch sold by Avaya, Inc.

A PBX switch may be located "on site" as customer premise equipment—CPE—(one example of CPE being the Definity switch sold by Avaya) or located within the communications network and used by one or more different customers. An exemplary network-based PBX is disclosed in U.S. Pat. No. 5,742,596 issued to Y. Baratz et al. on Apr. 21, 1998. With a network-based PBX, the various office locations may be referred to as "remote" in the sense that the physical office locations need to establish a link with the network-based PBX to obtain the desired functionality. The office stations themselves, however, are equipped with the traditional PBX station set equipment. The actual location of the PBX switch, therefore, is of no concern to the office worker.

In some situations, "telecommuters" have incurred the expense of adding an additional phone line, or ISDN, to handle the increase in telephony traffic associated with working at home. While this solution is acceptable in some situations, it quickly becomes an expensive alternative for the employer. Further, the "traveling" employee has no "home office" within which to install such equipment, remaining disadvantaged with respect to the personnel at a traditional work location. Indeed, the technology deployed at the home office may "lag" the latest PBX-based innovations found in the office.

As described in our pending application Ser. No. 09/370,766, an individual at a location "remote" from the office may have "PBX-like" capabilities, with all communications being controlled by a remote office platform, linked to the remote worker. In particular, the remote office platform is linked to the office PBX system. Features such as abbreviated dialing for in-house calls, call forwarding, call transfer, hold, three-way calling, secretarial pick-up, and more, are provided at a remote location where an individual can connect to the remote platform and have a user interface display available. The graphical user interface (GUI), in a preferred embodiment, is a "soft phone", displaying a PBX station-like set-up including a handset, call feature buttons, a message center, and the like.

The system as described in this pending application uses a remote office platform that communicates with both the office (or network) PBX and a data network coupled to the remote office location. The remote office platform includes the software necessary to "push" the GUI to the remote device and also comprises a database including necessary information regarding each employee permitted to access the "virtual PBX" system. Once activated by a remote worker, the remote office platform communicates with the office PBX so as to communicate all PBX-based requests from the remote location back to the office PBX. In the other direction, all incoming calls to the remote worker's PBX extension are forwarded by the PBX to the remote office platform and, ultimately, to the remote location. The term "office PBX" as used throughout this discussion is considered to include a customer-premise PBX, a network-based PBX (perhaps being shared by a number of different subscribers), or any other suitable PBX architecture.

In operation of this arrangement, a remote worker first establishes authenticated communication with the remote office platform. Voice connectivity between the office PBX and remote worker can be provided over whatever telephony connection exists at the remote location (POTS over PSTN, cable, fixed wireless, among others). Data connectivity, used for transferring all call requests between the remote worker and the remote office platform, as well as enabling the "soft phone" graphical user interface at the remote end, may be provided by any suitable data network including, but not limited to, the Internet.

Although the system as disclosed in our pending application is extremely proficient in allowing a "remote worker" access to many of the available office features, once the worker "logs out" of the system, all of the interconnect information is lost, and the worker must go through the entire process of logging in to be re-connected. While this is not very problematic for instances where the remote worker remains at the same off-site location, for those individuals that spend any quantity of time "on the road" or at multiple locations, it may become burdensome to constantly require the worker to re-activate the remote office system.

Thus, a need remains in the remote office environment for addressing the mobility of most remote workers, allowing such individuals to remain in communication with a remote office platform and modify/control the communication between the worker and the office connection.

SUMMARY OF THE INVENTION

The need remaining in the prior art is addressed by the present invention, which relates to a method and system for incorporating mobile location control of enhanced call service features at the mobile location such that the PBX-like features can be accessed anywhere.

Mobility is incorporated into a remote worker's environment by allowing the individual to enter a mobile number prior to ending an interconnect session with a remote office platform. Once the individual terminates a particular remote session, the stored mobile number associated with that individual will be used by the remote office platform to maintain an active session with the remote worker. In particular, a mobility process is created and maintained on a central server in the network so as to run in background mode, transparent to the user. When an individual terminates the remote session, the process will be triggered to initiate the mobile session. Thus, until the worker terminates the mobile session, the mobile number will be used by the remote platform to maintain contact with the remote worker.

In accordance with the present invention, once the worker is connected to the remote office platform via a cell phone (or any other suitable mobile device), speech recognition and DTMF tone recognition systems are utilized to allow the worker to control various aspects of the connection. That is, the speech commands and DTMF tone commands are translated into IP messages that are used to update and control the mobility process resident at the remote office platform.

If the mobile worker is in communication with the remote office platform using a device including a display area, a "mobile soft phone" graphical user interface (GUI) may be enabled at the mobile device and function to implement the PBX-like functions.

The mobility process of the present invention may be initiated directly by an individual terminating a session at his remote location or, alternatively, upon activation of the mobile device.

Other and further aspects of the remote worker mobility features of the present invention will become apparent during the course of the following discussion and by reference to the accompanying drawings.

BRIEF DESCRIPTION OF THE DRAWINGS

Referring now to the drawings,

FIG. 5 includes an exemplary "soft phone" GUI that is sent via the mobility applet to the mobile device.

DETAILED DESCRIPTION

Figure 1:
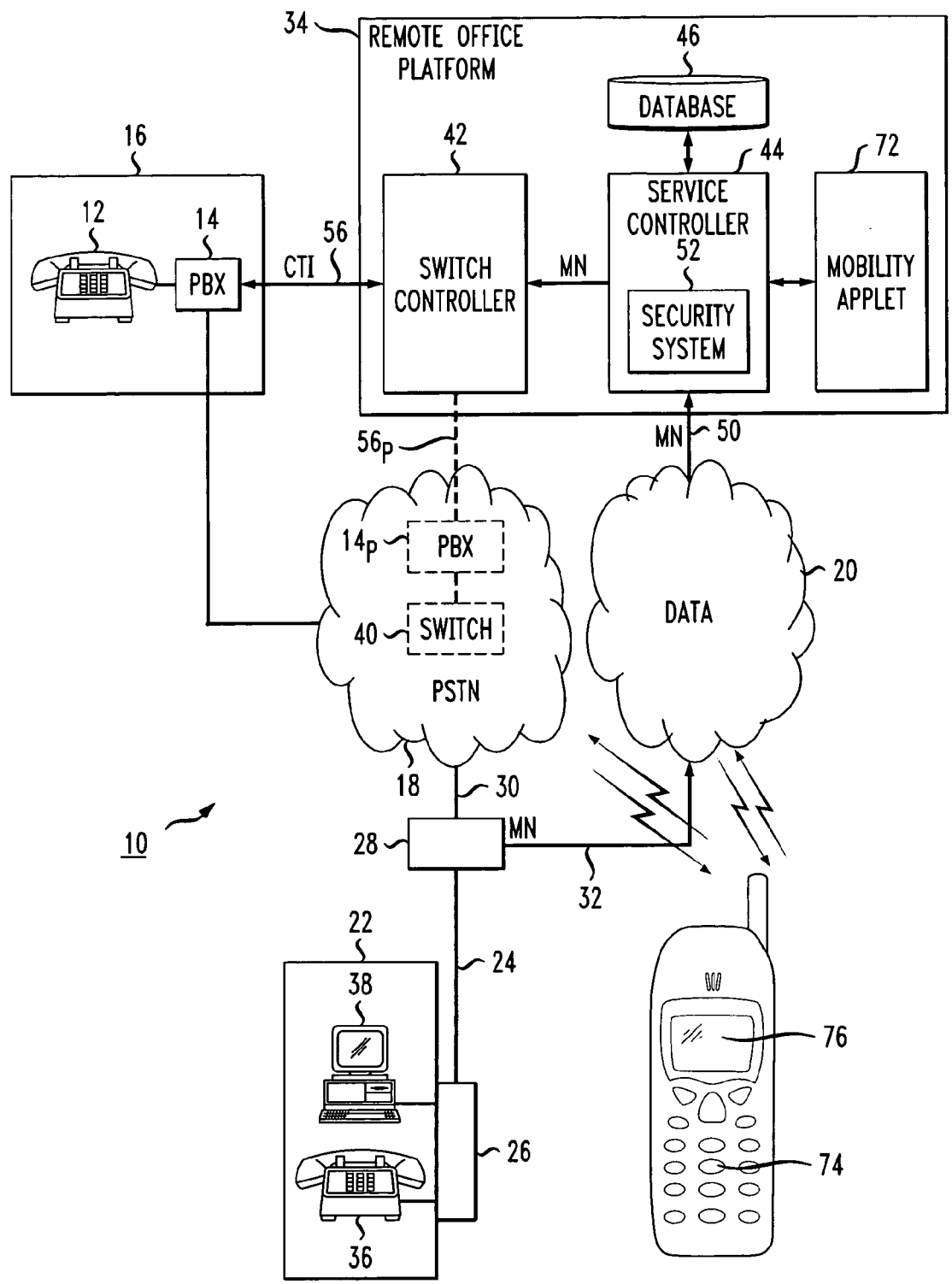
FIG. 1 contains a block diagram of an exemplary "remote worker" system incorporating the mobility aspect of the present invention.

An exemplary architecture 10 for implementing the mobility feature of a "remote office" platform is illustrated in FIG. 1. Throughout the remainder of this discussion, the term "remote office" will be used interchangeably with the term "virtual PBX", since in most instances it is PBX-like features that are implemented, via a soft phone graphical user interface (GUI) described below in association with FIG. 2, in a remote office location. In particular, FIG. 1 illustrates an arrangement including a conventional office station set 12 and PBX switch 14 located within a office structure 16. Each station set 12 includes conventional PBX features such as call forward, mute, hold, etc. PBX 14 is shown as connected to a voice network 18 (e.g., PSTN) and data network 20 (e.g., Internet). As mentioned above, the physical location of PBX switch 14 is not critical to the implementation of the present invention. That is, the PBX may comprise customer premise equipment—CPE—as shown in FIG. 1, or may, alternatively, reside in the network (e.g., a PBX switch $14_p$ as shown in phantom within PSTN 18 of FIG. 1). A network-based PBX may then be "shared" by a number of different customers. Regardless of its location, however, PBX switch 14 is considered as the "home" PBX for the purposes of the present invention, and it is the PBX functionality of that switch which is emulated in the remote/mobile environment by the remote worker in accordance with the teachings of the present invention. Additionally, PBX 14 is depicted in this particular embodiment as in communication with the worker through a traditional circuit-switched telephony connection (i.e., through PSTN 18). It is also possible for PBX 14 to be connected to and controlled through IP commands from data network 20.

A "remote"/home office location 22 is also shown in FIG. 1, utilizing a connection 24 (such as, for example, a cable connection) to provide all communication access (i.e., voice and data) to location 22. In particular, a cable modem 26 is connected to cable 24 and used to supply the various signals to different devices within location 22. At a cable headend 28 as shown in FIG. 1, a voice connection 30 is made to PSTN 18 and a data connection 32 is made to Internet 20.

The "remote office" features are provided to location 22 via a remote office platform 34, configured as shown in FIG. 1 to be communication with the conventional office 16 (or network-based PBX $14_p$) to effectively re-route traffic destined for station set 12 to a remote station set 36 and/or computer terminal 38. Remote office platform 34 includes a switch controller 42, service controller 44 and database 46. In the embodiment of FIG. 1 where PBX switch 14 is located within office 16 (i.e., as a CPE PBX), switch controller 42 is directly connected to PBX 14. In the case where a network-based PBX is used, an additional switch (illustrated in phantom as switch 40 within PSTN 18) may be used to direct the information flow from switch controller 42 to a network-based PBX 14p (also illustrated in phantom within PSTN 18 of FIG. 1). A data connection 50 is shown as coupling data/Internet network 20 to service controller 44.

The following discussion will provide details associated with "call flow" to/from a remote worker prior to activating the "mobility" option of the present invention, since it is important to first understand the workings of the remote office platform and the implementation of the PBX-like features for a remote worker. As mentioned above, a remote worker must first "log in" to the virtual PBX system in order to avail himself of any of the call features discussed above. To log in, a remote worker dials in, via his endpoint terminal (such as computer terminal 38) over data network 20 to a security system 52 within service controller 44.

Various security arrangements can be used to authenticate the remote worker and his capability to access the virtual PBX system. For example, a personal ID number and password may be used. Other arrangements are possible. Once the remote worker is authenticated, service controller 44 sends a message to switch controller 42, indicating that the control of all telecommunications with the identified remote worker are to be passed by PBX 14 to remote platform 34. Switch controller 42 then sends a message identifying the remote worker to PBX 14 and as a result, PBX 14 will now hand off all call control to remote platform 34 for calls received for the remote worker's identified station 12 within office 16 (whether the calls originate within the office or outside of the office) and PBX 14 will react based upon instructions from remote office platform 34. Obviously, the same mechanism will be utilized for a network-based PBX, where switch controller 42 instructs switch 40 to locate PBX switch $14_p$ and function as described above to hand off all telecommunications traffic destined for the remote worker to remote office platform 34.

An important feature of the "virtual PBX" arrangement which is particularly advantageous when incorporating the mobility aspect of the present invention is that the remote worker's actual location is not necessary for others to know in order to reach him at his usual office phone number. That is, a caller places a call to the remote worker in the usual fashion, dialing the office phone number associated with the remote worker (for internal calls, abbreviated dialing in terms of a 4 or 5-digit number may be dialed; for external calls, the conventional full number is dialed). PBX 14, upon recognition of the dialed number, will "hand off" the incoming call to remote platform 34 via (for example) a computer/telephony integration (CTI) link 56 to switch controller 42 (network PBX 14p utilizing a similar CTI link 56$_p$). The call is then passed to service controller 44 which performs a look-up in database 46 to determine the "reach" number for the remote worker. As will be discussed in detail below, the "reach" number becomes, by default, the worker's mobile number once a "remote session" is completed. Once the reach number is obtained, service controller 44 sends an "incoming call" message to the remote worker's "soft phone" via data network 20. If the remote worker is on another call, they have the option to place the first call on hold (such as by "clicking" the "hold" button 62 on soft phone display 60 of FIG. 2) and take the second call. In reality, when the "hold" button is activated on display 60, a "hold call" message is sent, via data network 20, back to PBX 14 which will, in fact, place the first call on "hold" within PBX 14. If there is no answer or a "busy signal" is encountered at the remote location, remote platform 34 will instruct PBX 14 to forward to the call to, for example, a voice messaging system (not shown, but may be included within service controller 44). Upon being notified that a voice message has been recorded, service controller 44 will send an indication to endpoint terminal 38 that a new voice message has been received, resulting in "lighting" a voice mail indicator 64 on soft phone display 60. Obviously, in situations where the endpoint terminal 38 does not include a display device, an alternative type of indication (such as a different ring pattern) may be used as the indicator.

The remote worker is also capable of placing outbound calls from endpoint terminal 38, where these calls will ultimately be processed by PBX 14. Therefore, the remote worker may use a speed dialing list, or any other PBX-like feature associated with his office station set 12 and stored in database 46 of remote office platform 34. The request to place the call may be initiated by activating, for example, "connect" button 66 on display 60. The "call connect" message is then sent, via data network 20, to remote platform 34. Service controller 44, in turn, tells switch controller 42 to instruct PBX 14 to place the call. PBX 14 ultimately connects the parties by launching a first call to the remote worker's station and a second call to the called party number, then bridges the calls together. In this "virtual PBX" arrangement, therefore, the remote worker's telephone will remain "on hook" for outbound calls until the remote platform calls back to bridge the calls together.

Figure 2:
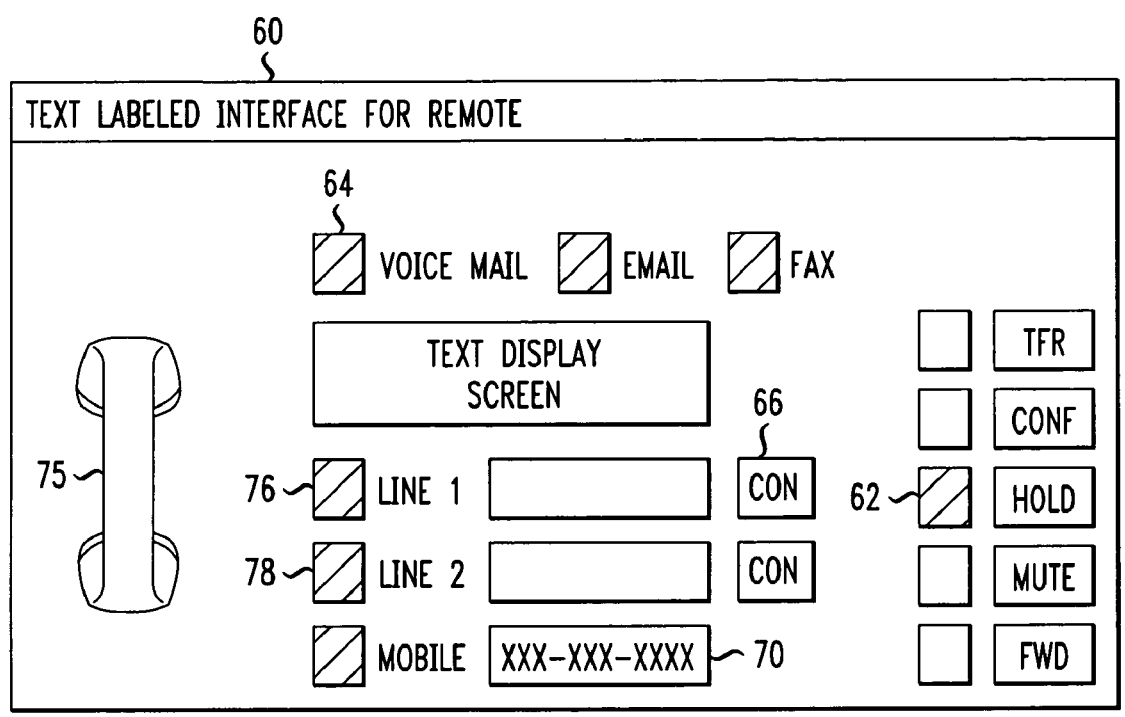
FIG. 2 illustrates an exemplary "soft phone" graphical user interface (GUI) available for a remote worker, including a mobile number interface.

An exemplary "soft phone" display 60 is illustrated in FIG. 2, and illustrates some of the various PBX station-type functionalities available for the remote worker. In accordance with the present invention, a mobile number (designated "MN" in FIG. 1) associated with the user is entered into field 70 on soft phone display 60 and will thereafter be used to control the remote mobility process. That is, once a remote user ends a session at a remote location such as location 22, a remote mobility process 72 located (for example) on remote office platform 34 will be activated, passing the mobile number from service controller 44 to switch controller 42. In one embodiment, mobility process 72 may be implemented as a Java script applet. However, various other tools may be used to generate the process controls necessary to provide the remote functionality. Referring back to FIG. 2, switch controller 42 will then inform PBX 14 to forward all calls to the mobile number (which may be, for example, the remote worker's cell phone number or reach number associated with any suitable PDA 74). Therefore, even though a remote worker ends a particular "virtual PBX" session at location 22, the remote worker will remain accessible via the activation of mobility process 72. The process will continue to run until the remote worker logs in again, or returns to the office location. In accordance with one embodiment of the present invention, once a "mobile" remote session is active, a check is made to determine if mobile device 74 can support a "mobile" soft phone GUI (such as display 76 discussed below in association with FIG. 4). If it can, then this display is pushed, via data network 20, to mobile device 74. Voice communication between remote office platform 34 and mobile device 74 will be maintained, in most cases, by a connection between PSTN 18 and mobile device 74. However, the capability of using IP telephony delivered via data network 20 cannot be ruled out. Alternatively, a "mobile" soft phone GUI may be implemented as software within mobile device 74, where the software is activated upon initiation of the mobile session. Broadly speaking, in either embodiment, mobile process 72 of the present invention functions to "enable" the GUI of the mobile device (i.e., by "pushing" it across the data connection or activating the resident software).

Figure 3:
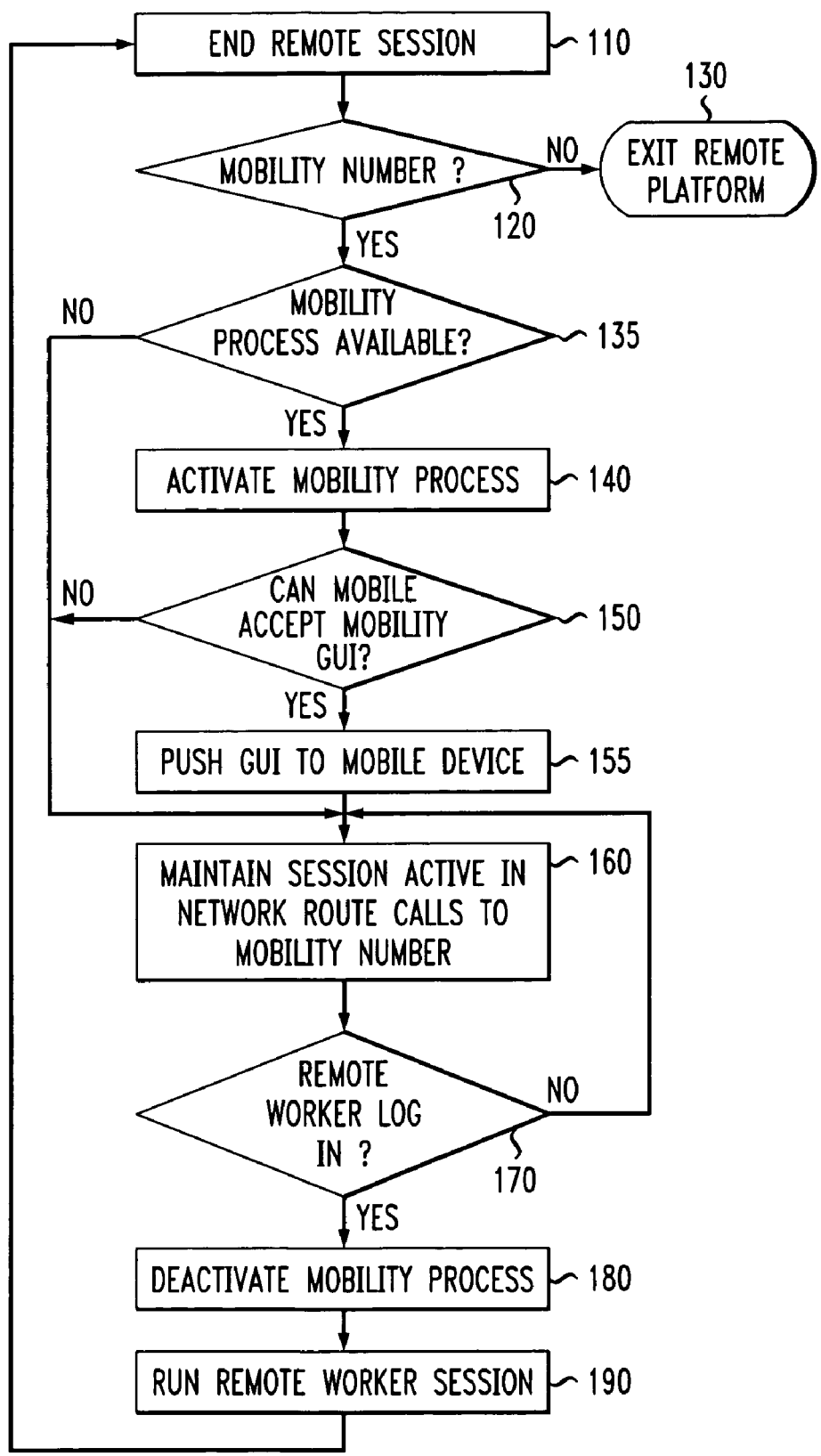
FIG. 3 is a flowchart illustrating the utilization of the mobility with a remote worker.

FIG. 3 contains a flowchart 100 illustrating the process steps associated with invoking the remote worker mobility system. At an initial step 110, a remote worker decides to end a particular remote session, for example, when the worker is leaving location 22. As the worker terminates, a check is made (step 120) to determine if the user has entered a mobility number MN (such as in field 70 in display 60 of FIG. 2). This number may be stored, for example, in the subscriber's information within database 46 and then forwarded to mobile process 72 when required. If no mobility information has been entered, the session will end in usual fashion (step 130), returning control to station set 12 associated with PBX 14. Alternatively, if a mobility number is found, a first check is made to determine if the mobility process is available (step 135). If not, a session will be maintained to route calls to the defined mobility number (step 160). If it is available, mobility process 72 will be activated (step 140), and a check will be made (step 150), as mentioned above, to determine if mobile device 74 associated with the particular mobility number includes a display to which the soft phone GUI may be sent (or, alternatively, this step may be used to send a command to mobile device 74 to "activate" its resident GUI software). If a GUI display is not available, the session is maintained using voice and DTMF commands, as described below. Alternatively, if the display on mobile device 74 supports the soft phone GUI, it will be enabled at device 74 (block 155) prior to activating the remote session. One aspect of process 72 will be to monitor the activity of the remote user, in particular, looking for an occasion when the user logs back into remote platform 34 (step 170) or returns to a location (e.g., the actual office location) which allows for direct access to PBX switch 14, either action resulting in "deactivating" the mobile session (step 180). Once a "deactivate mobile session" message is received by process 72, the mobility number will be deactivated (step 180) and a remote session can resume (step 190). Again, once the remote worker terminates a subsequent session, the mobility number may be reactivated (unless and until changed or removed by the remote worker).

Figure 4:
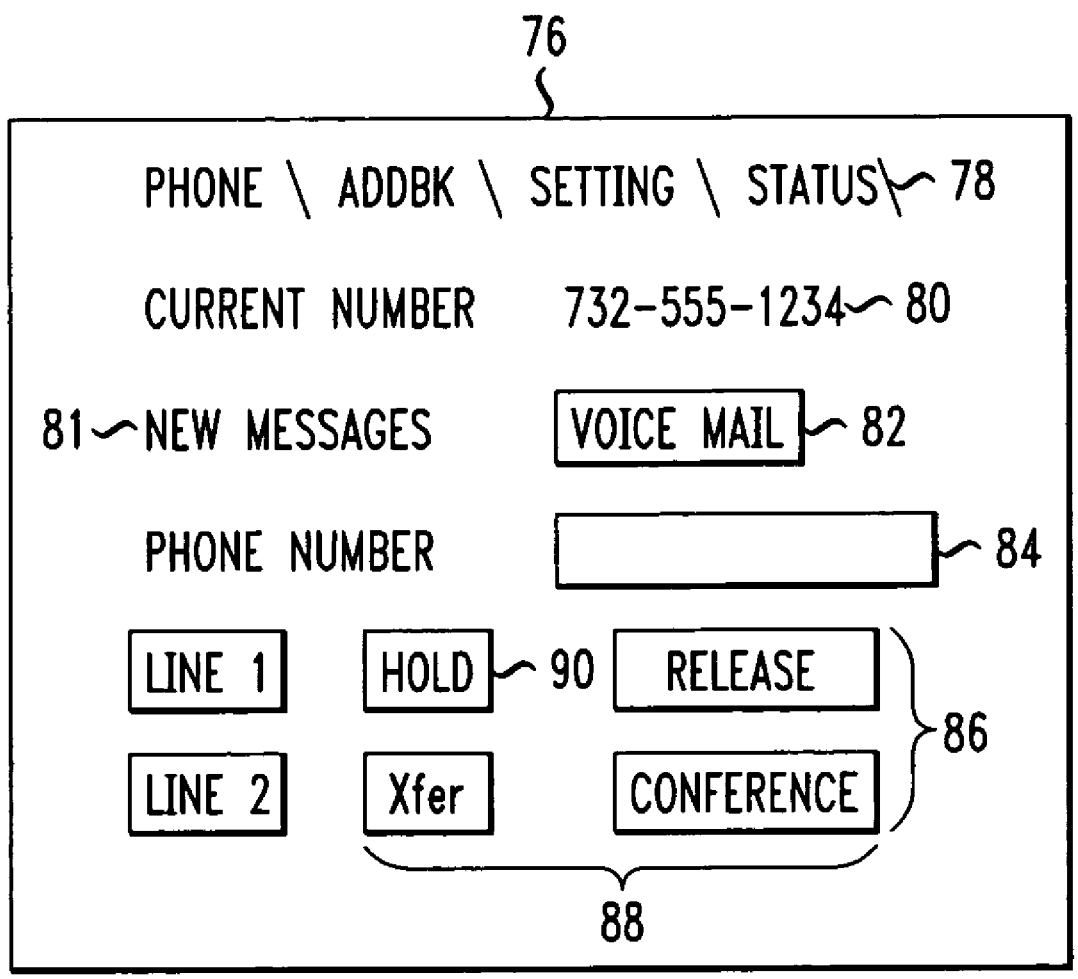
FIG. 4 is a system diagram particularly illustrating the utilization of mobility applet control in accordance with the present invention.

FIG. 4 illustrates an exemplary call control display 76 that may be enabled on a mobile device 74 by mobility process 72 (either pushed down over data connection 20, or activated within mobile device 74 via a command received from remote office platform 34). As shown, display 76 may include a section 78 related to updating and accessing a database of stored telephone directory information. A caller ID line 80 is also shown. Further a "notice" 81 indicating that voice mail messages have been received since the user left the remote location can be displayed, and in accordance with the present invention, a "soft phone" activation 82 may be used to retrieve the messages. Mobile display 76 also includes an area 84 for entering a telephone number being dialed by the mobile worker. As with soft phone display 60 discussed above, mobile display 76 can provide PBX-like capabilities, such as "hold", "transfer", "conference", etc., and may be used with two or more separate voice lines (denoted as display 86). Display area 88 illustrates an exemplary arrangement of soft phone-activated buttons that may be used by the mobile worker to implement the PBX functionality. Thus, if the mobile worker desired to put a call in progress on "hold", he can touch "hold" button 90 on display area 88. Mobility process 72 recognizes this command, which is sent via data network 20 to service controller 44, resulting in the transmission of a "hold" command through switch controller 42 to PBX 14. This can be initiated directly upon "log off" from the remote office, or via "log in" from the mobile device while the current mobility process is running.

In accordance with the present invention, when the remote worker's mobile access to remote office platform 34 is via a cell phone or any other suitable wireless device, various speech commands and/or DTMF tones can be utilized to provide call control for the various "virtual PBX station" attributes of the present invention. Referring to FIG. 5, a mobile remote worker communication device 200 is illustrated as in communication with remote office platform 34. Included within database 46 is a command database partition 210 that communications with worker's device 200 via mobility process 72. Also coupled to mobility process 72 is a voice recognition unit (VRU) 220. In accordance with the present invention, the capability of providing "command controls" at communication device 200 requires VRU 220 to be conferenced in on the call between device 200 and PBX 14 (via remote office platform 34). Therefore, if a remote worker decides to invoke a particular PBX-like "command control" function, for example, "transferring" the current call to another extension, command partition 210 within database 46 will interact with VRU 220 to implement this function. In particular, if the worker utters the command "transfer call to extension 1234", the utterance will be received at VRU 220 via the "conferenced" connection, where VRU 220 uses well-known speech recognition techniques to determine the particular command. The recognized language is then sent to command partition 210 within database 46 for performing the data look-up and forwarding to switch controller 42. In this embodiment, VRU 220 is illustrated as residing within remote office platform 34 and in communication with data network 20. It is to be understood that VRU 220 may also be resident at the office location with PBX 14, or in PSTN network 18 and in communication with network-based PBX 14$_p$.

In accordance with the present invention, VRU 220 remains in communication with mobile device 200 via conference call only when necessary, since the communication involves establishing and maintaining a separate communication link. Alternatively, VRU 220 can be used in an "off-line" mode in accordance with the present invention to update mobility process 72 (e.g., change the listed mobility number). Indeed, the remote worker may modify his mobile "reach number" at will, thus remaining in constant communication with the office PBX switch. In this case, VRU 220 is not bridged onto a voice path to mobile device 74. When it is necessary to link VRU 220 to the voice path, an IP signal from mobile device 74 can be used to conference in VRU 220, to provide communication with PBX 14 and the remote worker via switch controller 42.

While the present invention has been described in connection with the illustrated embodiments, it will be appreciated and understood that modifications may be made without departing from the true spirit and scope of the invention. It is to be understood that the particular embodiments shown and described are by way of illustration and in no way intended to be considered limiting. Therefore, references to details of a particular embodiment are not intended to limit the scope of the claims, which in themselves recite only those features regarded as essential to the invention.

What is claimed is:

1. A method of controlling PBX-like functionality at a mobile telecommunication location including a computer-based mobile device operating at a mobile telecommunication number for receiving information from a data network and including a display area, the computer-based mobile device not directly connected to a PBX switch, the method comprising the steps of:
   a) providing voice and data communication interconnections to voice and data networks at the mobile location;
   b) providing a remote office platform coupled between the mobile location and the PBX switch;
   c) authenticating, at the remote office platform, access to the PBX switch from the mobile location;
   d) in response to PBX-like commands received at the remote office platform from said mobile location, forwarding said commands to said PBX switch for call completion;
   e) in response to calls received at the PBX switch for an individual at said mobile location, sending said received calls to said remote office platform for forwarding to said mobile locations;
   f) enabling a soft phone graphical user interface at the computer-based mobile device; and
   g) configuring the soft phone graphical user interface to include the capability of updating the mobile telecommunication number so as to allow the individual to change the mobile telecommunication number used for communication with the remote office platform.

2. The method as defined in claim 1 wherein in performing step d), if the PBX-like commands comprise spoken commands, performing the steps of:
   i) at the remote office platform, performing a speech recognition function to translator the spoken command into a PBX-like command; and
   ii) transmitting the PBX-like command through the switch controller to the PBX switch.

3. The method as defined in claim 1 wherein in performing step d), if the PBX-like commands comprise DTMF tones, performing the steps of:
   i) at the remote office platform, mapping a received sequence of DTMF tones into an associated PBX-like command; and
   ii) transmitting the PBX-like command through the switch controller to the PBX switch.

4. The method as defined in claim 1 wherein in performing step d), the PBX-like command is updating the mobility number for use in communication with the individual.

5. The method as defined in claim 4 wherein the mobility number is updated by an individual speaking a command, performing a speech recognition function to translate the spoken command into a mobility number, and updating the remote office platform with the updated mobility umber.

6. The method as defined in claim 4 wherein the mobility number is updated by an individual entering DTMF tones into a mobility device, translating the DTMF tones into an updated mobility number and updating the remote office platform with the updated mobility number.

7. The method as defined in claim 1 wherein in performing step c) the remote office platform compares authentication information input by the mobile device user to predetermined authentication information stored in a database at the remote office platform.

8. The method as defined in claim 1 wherein in performing step f), the remote office platform transmits the soft phone graphical user interface across the data network to the mobile location.

9. The method as defined in claim 1 wherein in performing step f), the remote office platform activates a soft phone graphical user interface resident in software within the mobile device.

10. The method as defined in claim 1 wherein the data and voice communications with the mobile device is initiated by the mobile device.

11. The method as defined in claim 1 wherein the data and voice communications with the mobile device is initiated by the remote office platform.

* * * * *